Patented Aug. 4, 1953

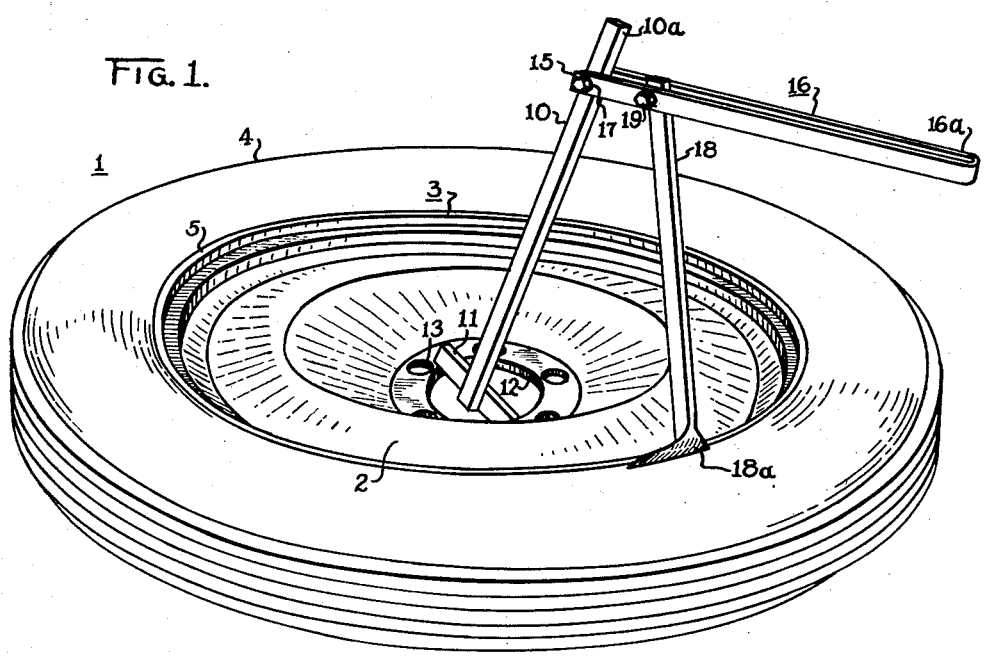

2,647,565

UNITED STATES PATENT OFFICE 2,647,565

LEVER ACTUATED TIRE BEAD LOOSENING TOOL

Dustin D. Patterson, Darlington, Pa.

Application August 24, 1950, Serial No. 181,167

2 Claims. (Cl. 157—1.17)

This invention relates generally to wheel servicing tools for vehicles and more in particular to a tool of this class which is applicable in the removal of a tire from the wheel of a vehicle.

Present day motor vehicles are equipped with wheels having fixed rims in which the beads of the tire are seated when the tire is properly positioned on the wheel. To remove the tire, the beads are forced transversely of the wheel towards a lesser diameter central section joining the rims, and when the beads are completely unseated from the rims the wheel may be tilted and pulled from the tire.

The operation of unseating each of the beads from its corresponding rim frequently presents a formidable problem, especially if the tire has been mounted for any length of time. Physical effort unaided by tools, in almost all cases, is insufficient to dislodge the beads from the rims.

A small portable tool is therefore indicated as a solution to this frequently occurring problem.

It is, therefore, one object of this invention to provide a tool of the class described which is simple in its elements and positive in operation.

Another object of this invention is to provide a tool for loosening the bead of a tire from the rim of a wheel, which tool has sufficient mechanical advantage to require a minimum of physical effort.

A further object of this invention is to provide a tool of the class described which is attachable without tools or clamping means to the vehicle wheel.

Yet a further object of this invention is to provide a tool of the type referred to in any of the preceding objects which is foldable into a compact unit when stored.

Still another object is to provide a tool of the character referred to which is easily manufactured and economical in price.

The foregoing statements are merely illustrative of the various aims and objects of this invention. Other objects and advantages will become apparent upon a study of the following disclosure when considered in conjunction with the accompanying drawing, in which:

Fig. 1 is an illustration in perspective of a tire tool embodying the principles of this invention, the tool being shown in operative position on a vehicle wheel;

Fig. 2 is a view showing the vehicle wheel in section and illustrating the tire tool shown in Fig. 1 in operative position thereon;

Fig. 3 is a fragmentary illustration of a modification of this invention; and

Fig. 4 is another fragmentary illustration of a further modification of this invention.

Referring to Figs. 1 and 2, the vehicle wheel assembly 1 generally comprises a steel wheel having a shaped disc 2 fitted with a tire mounting rim assembly 3 in which a tire 4 is secured. The rim assembly is usually an integrated structure having a pair of transversely spaced similarly shaped rims 5 (see Fig. 2) joined by a lesser diameter central section 6 which is seated on a flange 7 defining the outer peripheral edge of a shaped disc 2 and secured thereto by welding. Tire beads 8, which are forced outwardly onto rims 5 upon inflation of an inner tube 9 in the tire 4, are positively secured upon the corresponding rim 5 when the tire is properly inflated. The forces due to air pressure in the tire which force the beads over the rims are high and consequently an initial snug fit is feasible, which, in itself, makes dislodging the beads from the rims after deflation of the tube difficult. Moreover, because of the accumulation of the products of oxidation of the steel of the rims with time, between the beads 8 and rims 6, the dislodging forces which are required become correspondingly higher.

The tire tool of this invention is a simple lever system which includes an elongated support or bar 10 having a cross bar 11 secured at its lower end, substantially at right angles thereto, as seen in both Figs. 1 and 2. Cross bar 11 is of sufficient length to diagonally straddle an opening 12 in the center of disc 2, adapted to receive a mounting hub (not shown) which is fixed to the vehicle axle. This mounting hub, according to standard practice, is usually tapped at angularly spaced points about a boring circle in correspondence with holes 13 in the disc about opening 12, to threadedly receive wheel mounting bolts (not shown) which clear through holes 13. Such mounting details being common knowledge are not illustrated in the interest of simplicity.

One end 15, the open end, of a lever 16, which is of U-shaped construction, formed, for example, of a piece of flat steel strap, is pivotally connected by a bolt 17 to the support 10 at a point adjacent the upper end thereof, as viewed. In the assembly the legs of the lever 16 straddle the support 10. A tire iron 18 is pivotally connected between the legs of the lever 16 by a bolt 19 at a point on the lever 16 spaced a short distance from the pivot bolt 17, while the lower end of tire iron 18 formed as a tip 18a of suitable configuration engages the tire 4 in the region of the bead 8 at the edge of the corresponding wheel rim 5. The remaining end 16a of lever 16, constituting a force applying handle, extends essentially radially outwardly over the tire 4.

By reference to either of Figs. 1 or 2, it will be noted that the linkage as described when in operational position on the wheel assembly is essentially of trapezoidal configuration, in which, the lower base defined between the center of the wheel disc and tip 18a of tire iron 18 is of longer length than the upper base defined between the pivot bolts 15 and 17, the mechanical advantage of the linkage being defined essentially by the ratio of the lengths of the moment force downwardly on handle 16a results in forces arms of the lever 16.

From observation of the linkage system, particularly as seen in Fig. 2, the application of force downwardly on handle 16a results in forces tending to rotate tire iron 18 in a counterclockwise direction about tip 18a. The linkage through lever 16 with support 10 tends to similarly rotate the support 10 including cross-bar 11 while at the same time exerting an upward pull thereon. But this rotation and upward pull is prevented by the cross-bar 11 which is blocked against the opposite edges of wheel hub opening 12 and is moved into more positive engagement therewith by these forces. Hence no possibility of collapse of the linkage by slipping of cross-bar 11 exists and the multiplied force on handle 16a is applied as a dislodging load on the bead 8 by the tire iron tip 18a.

In the modification of Fig. 3, cross-bar 11a is of the configuration of a flat S having its central portion disposed substantially at right angles to the longitudinal axis of support 10, the end sections thereof substantially paralleling the faces of the wheel disc at the areas of contact. Better distribution of stresses in the wheel disc adjacent opening 12 is obtained with this structure, and at the same time the geometry is such as to aid in locating the cross-bar in the hub opening 12.

The locating advantages of the structure of Fig. 3 are inherent in the structure of Fig. 4 wherein the cross-bar 11b is essentially of the shape of an obtuse angle, one leg thereof adjacent the vertex of the obtuse angle being secured to the lower end of the support 10 at substantially right angles thereto.

In operation after the wheel has been removed from the vehicle and placed on the ground, the tire tool is positioned thereover with both the support 10 and tire iron 18 projecting downwardly therefrom. Support 10 is lowered and tilted at a sufficient angle to position cross-bar 11 diagonally through wheel hub opening 12. Thereafter tire iron tip 18a is positioned on the tire beside, or at the edge of, the wheel rim. Using the projecting end 10a of support 10, as a steadying hand grip and steady rest, if necessary, downward force (body weight) is applied to handle 16a forcing the tire iron into the bead and forcing the bead of the rim. This operation, by simply rotating the tool about the hub opening 12, is repeatable as often as necessary at angularly displaced positions on the present bead and on the opposite bead also if necessary, after the wheel is turned over, to force the beads off the rims.

It will be appreciated from the foregoing considerations that this invention realizes the advantages hereinabove outlined due, primarily, to its simplicity of construction and equal simplicity of operation. No tools are required for attachment of the tool to the wheel assembly, nor is assembly of the tool for use required, since when assembled, it may be folded into a compact unit of little more bulk than the operating lever or handle 16.

Numerous variations in details, in addition to those herein noted, which are presently believed to represent preferred embodiments, are, of course, readily apparent to those skilled in the art without departing from the spirit and scope of this invention.

I claim:

1. A tool for loosening the bead of a tire from the rim of a vehicle wheel having a central axle opening comprising a T-shaped member providing an anchoring bar and supporting bar, said anchoring bar having its end portions bent at an obtuse angle in opposite directions, so as to provide wheel engaging surfaces on opposite sides of the wheel and at diametrically opposite edges of the wheel opening, said supporting bar being rigidly connected to and extending upwardly from said anchoring bar, a lever comprising a straight bar having one end pivotally connected to the upper end of said supporting bar and its other end providing a handle, and a tire iron having a tip at its lower end for engaging the tire in a region of the bead thereof and a pivotal connection at its upper end to said lever straight bar at a point between the handle and the pivotal connection to said supporting bar.

2. A tool for loosening the bead of a tire from the rim of a vehicle wheel having a central axle opening comprising a supporting bar having an anchoring bar rigidly secured to and extending transversely of its lower end, said anchoring bar providing a base member extending through said wheel opening at an angle with respect to a diameter of the wheel and having end portions providing wheel engaging surfaces on opposite sides of the wheel and at diametrically opposite edges of the wheel opening, said supporting bar extending upwardly from said anchoring bar and forming substantially a right angle therewith and having its lower end at the center of the wheel and its upper end between the center and rim of the wheel and spaced from the plane of the wheel, a lever bar having a pivotal connection at its inner end to said upper end of the supporting bar and its outer end providing a handle extending in a direction substantially parallel to and spaced from the plane of the wheel and the tire mounted thereon, and a tire iron depending substantially vertically from said lever bar and having its upper end pivotally connected thereto at a point adjacent the said pivotal connection between said lever bar and supporting bar and its lower end providing a tip for engaging the tire in the region of the bead thereof, said wheel engaging surfaces being effective to lock said anchoring bar and supporting bar against pivotal movement with respect to said wheel when said handle is moved to actuate said tire iron downwardly to loosen the tire bead from the wheel rim.

DUSTIN D. PATTERSON.

References Cited in the file of this patent

UNITED STATES PATENTS

| Number | Name | Date |
|---|---|---|
| 1,567,276 | Kowalzcyk et al. | Dec. 29, 1925 |
| 2,241,886 | Pierce et al. | May 13, 1941 |
| 2,433,113 | Graves et al. | Dec. 23, 1947 |
| 2,489,088 | Hewitt | Nov. 22, 1949 |
| 2,501,225 | Kuhlmann | Mar. 21, 1950 |